United States Patent
Barnett

[15] 3,699,515
[45] Oct. 17, 1972

[54] MOVEMENT RESPONSIVE ALARM SYSTEM FOR A VEHICLE

[72] Inventor: Howard James Barnett, 4433 North Stanton, Apt. 412, El Paso, Tex. 79920

[22] Filed: Jan. 4, 1971

[21] Appl. No.: 103,698

[52] U.S. Cl. .......................340/65, 200/42, 307/10
[51] Int. Cl. .............................................B60r 25/10
[58] Field of Search..........340/63, 64, 65, 274, 276; 307/10; 200/42

[56] References Cited

UNITED STATES PATENTS

| | | |
|---|---|---|
| 3,562,706 | 2/1971 | Mason.........................340/65 |
| 3,513,466 | 5/1970 | Isaacs et al...............340/63 X |
| 3,329,935 | 7/1967 | Wiggins.....................340/65 |
| 2,984,820 | 5/1961 | Kennell .....................340/65 |

*Primary Examiner*—Alvin H. Waring

[57] ABSTRACT

An automatic alarm system which sounds an upward screaming siren produced by an electronic siren module and a speaker including movement responsive switches for activating the alarm, a latching relay to hold the siren on and a thermostatic delay relay to automatically shut it off after a predetermined length of time and then reset it.

5 Claims, 5 Drawing Figures

PATENTED OCT 17 1972 3,699,515

INVENTOR.
HOWARD J. BARNETT

MOVEMENT RESPONSIVE ALARM SYSTEM FOR A VEHICLE

This invention relates to an alarm system but more particularly to a motor vehicle alarm system that sounds an upward screaming siren which is produced by a siren module and a speaker. The alarm is activated by movement responsive switches, held on by a latching relay and turned off and reset automatically after a predetermined length of time by a thermostatic delay relay.

An object of this invention is to provide a novel and improved means of protecting property and particularly vehicles from damage, theft or theft of its parts and contents, by an alarm system that is relatively simple in construction, easy to install and sounds a timed upward screaming siren and turns on interior lights when the vehicle is entered, bumped or disturbed by unauthorized personnel.

Another object of this invention is to provide an improved automatic siren alarm system that is reliable, inexpensive, easily adjustable to a desired degree of sensitivity and compact in size so that it can be easily installed to protect property by operating during unauthorized entry and if bumped, tilted or moved in any way when unattended.

A further object of this invention is to provide a siren alarm system to protect property and specifically motor vehicles from unauthorized entry, theft, theft of interior parts and contents thereof and theft of exterior parts, the system being activated by opening a door, hood or trunk, or being shaken, tilted or moved in any way.

A still further object of this invention is to provide a novel, easily adjustable movement responsive switch for actuating an electrical circuit.

A still further object of this invention is to provide a novel, easily adjustable movement responsive switch which automatically levels itself and is therefore independent of the angle or attitude at which it is.

Further objects and advantages will become apparent from the following description and claims, and from the accompanying drawings forming a part hereof and in which:

Figure 1:
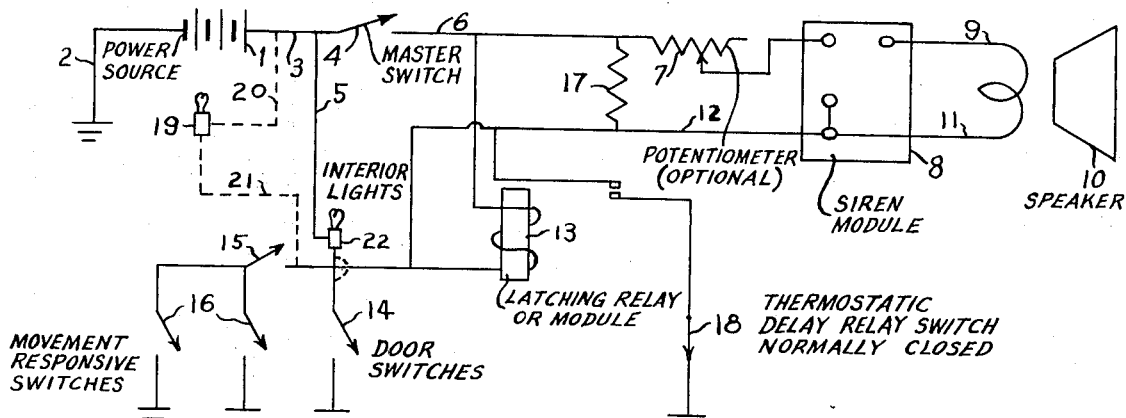
FIG. 1 is a wiring diagram showing the electrical circuit of an alarm system constructed in accordance with the present invention.

Referring to the drawings and FIG. 1 in particular, the system is powered by a battery or other power source, one pole being grounded by wire 2, the other pole being connected by wire 3 to master switch 4, which is a key operated switch mounted on the outside portion of the vehicle or other property to be protected and connected to interior lights 22 by wire 5 and to one terminal of siren module 8 through wire 6 and optional potentiometer 7 (for volume control). The second and third terminals of siren module 8 are connected to speaker 10 through wires 9 and 11 respectively. The third terminal of siren module 8 is further connected by wire 12 to latching relay 13, interior lights 22, door switches 14 and to trunk, hood and movement responsive switches 16 through lockout switch 15 which when open prevents interior lights 22 from flickering on and off as movement responsive switches are activated during vehicle travel. When closed, with master switch open, lockout switch 15 affords a means for the operator to adjust the sensitivity of the switches without actuating the siren, by observing when the interior lights go on or by observing light 19 which is optional and is discussed later.

The thermostatic delay relay heater circuit 17 is connected in parallel to the siren module 8 while the normally closed switch circuit 18 of the delay relay is connected to ground.

Once master switch 4 has been closed the system is armed, but no current will flow and thus the siren will not sound until one or more of the door 14 (and if lockout switch 15 has been closed) the hood and movement responsive switches 16 are closed to complete the circuit. At this time the current flows through the siren module 8 activating the speaker 10 to sound an upward screaming siren and simultaneously through the interior light circuit as well as the latching relay 13 keeping the circuit complete even though the original activating switch or switches (other than the master switch) be opened. At the same time the current flowing through the heater portion 17 of the delay relay will, after a predetermined time, open the normally closed contacts of the delay relay 18. This releases the latching relay 13 so that the circuit is broken and the siren shuts off, but is immediately ready for reactivation as the heater circuit 17 of the thermostatic delay relay cools instantaneously. If, however, the original or other of the activating switches 14,16 are held closed or reactivated the siren will continue to operate and the interior lights will remain on until these switches or the master switch 4 is opened.

With the use of the movement responsive switches, door and hood as well as trunk switches may not be desired. Therefore, a small light 19 can be wired into the circuit from power source 1 through wires 20 and 21 which will not operate unless lockout switch 15 is closed as well as the activating switches 16. Thus affording a means of testing and setting the sensitivity of the system without the siren sounding.

Figure 2:
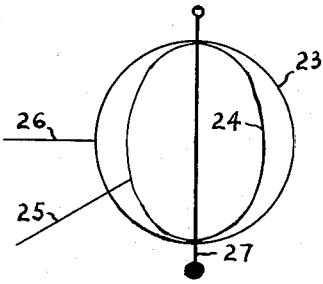
FIG. 2 is a perspective view of the novel movement responsive switch.
Figure 3:
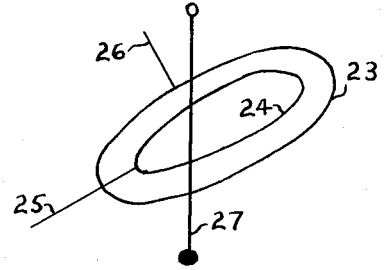
FIG. 3 is another perspective view of the movement responsive switch shown in FIG. 2, but adjusted to a different sensitivity.

Referring to FIG. 2, the movement responsive switch has two rings of electrical conductive material 23 and 24 which are rotatable through 90° by rotating shafts 25 and 26 respectively. These shafts are located at right angles to each other. When both rings are in the horizontal position, FIG. 3, the weighted shaft 27 hanging through the two rings 23 and 24 can swing through its maximum arc before touching any point on either ring. Ring 23 is slightly larger than ring 24 so that ring 24 can be rotated inside ring 23 by turning shaft 25 and so that ring 23 can be rotated outside ring 24 by turning shaft 26. Thus the two rings can be positioned so that any movement would cause weighted shaft 27 to touch one or both of the rings completing a circuit if the weighted shaft 27 is wired to be positive or negative and the rings the opposite. If the vehicle or other property to be protected were on an incline the rings 23 and 24 would be turned to a flatter position so that the switch could be used. FIG. 3 shows the rings turned to their flattest position. As the incline or tilt is decreased the rings are rotated by turning shafts 25 and 26 to a more upright or vertical position to maintain the desired proximity to the weighted shaft 27 and thus maintain the desired sensitivity of the switch. Only one ring could be used, but this would not allow for a swing of weighted shaft 27 in a direction parallel to the ring. The second ring at right angles eliminates this problem.

Figure 4:
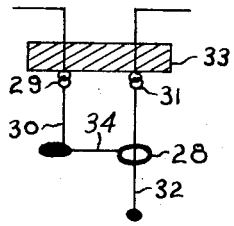
FIG. 4 is a perspective view of a second and novel, automatically leveling, movement responsive switch.

Referring to FIG. 4, this automatically leveling, movement responsive switch has an electricity conductive ring 28 which hangs or juts out either directly or by means of a connecting member 34 from a free-swinging counter-weighted shaft 30. The shaft is free-swinging by use of rings 29 or the like, attached to a nonconductive base 33. A weighted straight shaft 32 hanging by rings 31, which are also attached to the nonconductive base 33, passes through ring 28 and is also electrically conductive and free-swinging, but is longer than shaft 30. Whatever angle the object to be protected is at, the two shafts 30 and 32 hang parallel to each other when settled so that shaft 32 does not touch ring 28 and thus the switch is self-leveling. When disturbed, however, shaft 32 and ring 28 collide with each other since their rates of swing vary, thereby completing an electrical circuit. Ring 28 can be rotated from a horizontal position to a more vertical one which reduces the distance of the ring from shaft 32 thus making the switch more sensitive. The degree of sensitivity depending upon how much ring 28 is turned and its diameter. Sensitivity adjustment can also be made by bending shaft 30 toward or away from shaft 32 or by bending ring 28 or its connecting member 34 laterally (horizontally) so that ring 28 will hang closer or further from shaft 32 when settled.

Figure 5:
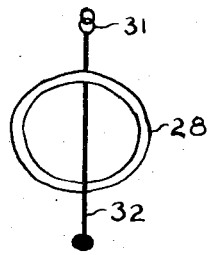
FIG. 5 is a perspective view of an enlargement of a portion of the switch shown in FIG. 4.

Referring to FIG. 5, ring 28 can be of round stock or may have width and be tapered so that shaft 32 will make a better electrical contact all along the inside of the ring when oscillating.

The master switch (key switch) 4 is located preferably in a convenient and conspicous place outside the vehicle so that it will be obvious to a trained or knowledgeable observer that the vehicle is protected by an alarm system. The lockout switch 15 is best located on or behind the dashboard in an easily accessable position. The speaker (preferably waterproof) 10 is best mounted in the "under the hood" area, but directed outward so as to produce the loudest siren sound outside the vehicle or other object to be protected. The siren module 8, latching relay 13, thermostatic delay relay 17 and 18 and movement responsive switches 16 as well as small light 19 (if employed) can all be housed in a small container attached to the inside fender wall or firewall or some other suitable place in the "under the hood" area, or under the dashboard or other suitable place.

The door switch 14 and hood and trunk switches 16 are of the regular push or plunger type switch that is off when depressed, but on when released, as are the courtesy light switches for interior lighting of an automobile when the doors are opened and closed. In fact, where the doors of an automobile are concerned the alarm can be wired into this lighting circuit so that the following advantages are gained: (1) When the alarm is activated at night the interior of the automobile will light up as a further deterrent to the intruder. (2) The lights are an indicator that tells the operator of the alarm whether or not the siren will sound if he turns on the master switch 4. For example, if a door or the hood is not shut completely or if one of the other activating switches 16 is closed and the master switch 4 is closed the siren would sound, thus causing embarassment and possibly some explaining to police. When the light is on, however, the operator knows not to turn on the master switch 4 until he rectifies the cause. (3) This also eliminates the necessity of separate door switches as the already existing ones are used.

One of the movement responsive switches can be any of the mercury or vibration switches currently on the market. Some of the vibration types having contacts on a flexible or hair spring which make contact when disturbed.

I claim:
1. A self leveling sensitivity adjustable vehicular alarm apparatus comprising:
   a. a non conducting base mount;
   b. a first conducting weighted shaft suspended from and pivotally connected to said mount at a first pivot point wherein said first shaft includes a conducting ring adjustably connected to and disposed at a variable angle to said first shaft, wherein said conducting ring constitutes a first contact point and a sensitivity control;
   c. a second conducting weighted shaft independently suspended from and pivotally connected to a second pivot point wherein said second shaft has a rate of swing different from the rate of swing of said first shaft and is positioned to pass through the center of said conducting ring, wherein said second shaft constitutes a second contact point; and
   d. an alarm means electrically connected to said first and second contact points wherein said means is activated when said first and second contact points come into physical contact with each other.
2. A vehicular alarm system comprising:
   a. a power source;
   b. an alarm module;
   c. a master switch connected between said power source and said alarm module;
   d. a movement responsive switch for connecting said alarm module to said power source having a non conducting mount and two independently suspended conducting shafts, one of which includes an adjustably connected conducting ring disposed thereto at a variable angle and through which passes the other conducting shaft;
   e. delay relay means having normally closed contacts for opening said contacts to break the circuit and stop the alarm after a predetermined length of time; and
   f. a latching relay responsive to the closing of the contacts of said movement responsive switch to maintain power to said delay relay means and to maintain the connection of said power source to said alarm module.
3. A vehicular alarm system according to claim 2 comprising further a circuit connecting the vehicular lights to said movement responsive switch and causing the lights to turn on and off simultaneously with said alarm.

4. A vehicular alarm system comprising:
a. a power source;
b. an alarm module;
c. a master switch connected between said power source and said alarm module;
d. a movement responsive switch for connecting said alarm module to said power source wherein said switch includes a weighted conducting shaft suspended through a pair of concentric conducting rings, each of which is rotatable with respect to the other to facilitate a sensitivity adjustment wherein said conducting shaft constitutes a first contact point and either of said conducting rings constitutes a second contact point;

e. delay relay means having normally closed contacts for opening said contacts to break the circuit and stop the alarm after a predetermined length of time; and
f. a latching relay responsive to the closing of the contacts of said movement responsive switch to maintain power to said delay relay means and to maintain the connection of said power source to said alarm module.

5. A vehicular alarm system according to claim 4 comprising further a circuit connecting the vehicular lights to said movement responsive switch and causing the lights to turn on and off simultaneously.

* * * * *